United States Patent
Jerregård et al.

(10) Patent No.: US 10,150,214 B2
(45) Date of Patent: Dec. 11, 2018

(54) METHOD FOR CONTROLLING AN INDUSTRIAL ROBOT BY TOUCH

(71) Applicant: ABB Schweiz AG, Baden (CH)

(72) Inventors: Henrik Jerregård, Västerås (SE); Tomas Groth, Västerås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/561,752

(22) PCT Filed: Mar. 31, 2015

(86) PCT No.: PCT/EP2015/056983
§ 371 (c)(1),
(2) Date: Sep. 26, 2017

(87) PCT Pub. No.: WO2016/155787
PCT Pub. Date: Oct. 6, 2016

(65) Prior Publication Data
US 2018/0104817 A1    Apr. 19, 2018

(51) Int. Cl.
*B25J 9/16*    (2006.01)
*G05B 19/423*    (2006.01)

(52) U.S. Cl.
CPC ........... *B25J 9/1633* (2013.01); *B25J 9/1656* (2013.01); *B25J 9/1664* (2013.01); *G05B 19/423* (2013.01);
(Continued)

(58) Field of Classification Search
CPC ................... B25J 9/1633; B25J 9/1664; B25J 13/081–13/085; G05B 19/423;
(Continued)

(56) References Cited

U.S. PATENT DOCUMENTS 6,088,628 A * 7/2000 Watanabe .............. B25J 9/1656
700/251
6,218,801 B1   4/2001 Brogårdh et al.
(Continued)

FOREIGN PATENT DOCUMENTS

CN    101192062 A    6/2008
CN    102300679 A    12/2011
(Continued)

OTHER PUBLICATIONS

International Preliminary Report on Patentability Application No. PCT/EP2015/056983 dated May 29, 2017 7 Pages.
(Continued)

*Primary Examiner* — Bao Long T Nguyen
(74) *Attorney, Agent, or Firm* — Whitmyer IP Group LLC

(57) ABSTRACT

A robot and method for controlling an industrial robot, which has a first robot arm, a second robot arm, a joint defining a kinematic pair between the first and second robot arms, an actuator for generating relative movement between the first and second robot arms, and a robot controller for controlling the movements of the actuator. The method includes the steps of: determining a presence of a first torque indication at the actuator to be interpreted as a first command to the robot controller; repeatedly obtaining an external torque value ($\tau_{ext}$) to obtain an external torque behavior; comparing the external torque behavior with the first torque indication; and executing a robot function corresponding to the first command upon detecting that the external torque behavior corresponds to the first torque indication. The obtained external torque behavior depends on a reference torque value ($\tau_{ref}$) obtained from a dynamic model of the robot.

10 Claims, 1 Drawing Sheet

(52) U.S. Cl.
CPC .............. *G05B 2219/36418* (2013.01); *G05B 2219/41387* (2013.01)

(58) Field of Classification Search
CPC ........... G05B 2219/36418; G05B 2219/41387; G05B 2219/39325; Y10S 901/04
USPC ...................................... 700/261, 257; 901/4
See application file for complete search history.

(56) References Cited

U.S. PATENT DOCUMENTS

| | | | | |
|---|---|---|---|---|
| 6,594,552 | B1* | 7/2003 | Nowlin | B25J 9/1689 700/260 |
| 6,754,560 | B2* | 6/2004 | Fujita | B25J 13/003 318/568.12 |
| 9,579,787 | B2* | 2/2017 | Zimmermann | B25J 9/0081 |
| 9,616,564 | B2* | 4/2017 | Pfaff | B25J 9/0081 |
| 2005/0222714 | A1* | 10/2005 | Nihei | G05B 19/423 700/264 |
| 2010/0324733 | A1 | 12/2010 | Bischoff et al. | |
| 2011/0178638 | A1 | 7/2011 | Tsusaka et al. | |
| 2011/0313573 | A1 | 12/2011 | Schreiber et al. | |
| 2012/0130541 | A1* | 5/2012 | Szalek | B25J 9/106 700/258 |
| 2012/0185089 | A1 | 7/2012 | Schreiber | |
| 2012/0283875 | A1 | 11/2012 | Klumpp et al. | |
| 2014/0379126 | A1 | 12/2014 | Ueberle | |
| 2015/0081098 | A1* | 3/2015 | Kogan | B25J 9/1656 700/258 |
| 2015/0258690 | A1* | 9/2015 | Naitou | G01L 5/226 700/253 |

FOREIGN PATENT DOCUMENTS

| | | |
|---|---|---|
| CN | 102387900 A | 3/2012 |
| CN | 103347662 A | 10/2013 |
| EP | 1950010 A2 | 7/2008 |
| JP | S59157715 | 9/1984 |
| WO | 9710080 A1 | 3/1997 |
| WO | 9853376 A1 | 11/1998 |
| WO | 0060427 A1 | 10/2000 |

OTHER PUBLICATIONS

International Search Report and Written Opinion Application No. PCT/EP2015/056983 Completed Date: Dec. 2, 2015; dated Dec. 9, 2015 12 Pages.

Office Action from The People's Republic of China Application No. 201580078405X dated Jun. 27, 2018 4 pages.

* cited by examiner

METHOD FOR CONTROLLING AN INDUSTRIAL ROBOT BY TOUCH

TECHNICAL FIELD

The present invention relates to a method for controlling an industrial robot, according to which method commands are given to the robot by touching it.

BACKGROUND

It is previously known to give commands to a robot by touching it. For example, an operator may start and stop a work cycle of a robot by giving the robot a push. The existing systems for detecting the commands are based on external sensors on the robot. A torque sensor positioned at a joint of the robot may for example detect an external torque exerted on that joint as a result from the operator pushing a robot arm. It may be necessary to compare a measured torque with an expected torque in order to be in the position of detecting an external torque. The expected torque would typically be based on a reference measurement where the work cycle of the robot is executed without external torques being present. When a presence of a certain torque indication at the respective joint is determined in beforehand to be interpreted as a command to the robot controller, the robot controller may execute the command upon detecting that a torque behaviour corresponding to the torque indication is present.

Basing the detection of commands on external torque sensors requires sophisticated sensors to be positioned at the robot joints. Moreover, if the detection of an external torque is based on a reference measurement, no external torque can be detected during arbitrary robot movements that are executed for the first time. Thus, there remains a desire to improve the existing robot controlling systems such that no external torque sensors and/or reference measurements are required.

One object of the invention is to provide an improved method for controlling an industrial robot by touch.

SUMMARY

This object is achieved by the method according to the different features of the invention.

The invention is based on the realization that a robot comprising a robot controller with a dynamic model of the robot and a resolver based feedback control contains all necessary elements for enabling a detection of an external torque behaviour. The external torque behaviour can in its turn easily be turned into commands to a robot controller.

According to a first aspect of the invention, there is provided a method for controlling an industrial robot, the robot comprising a first robot arm, a second robot arm, a joint defining a kinematic pair between the first and second robot arms, an actuator for generating relative movement between the first and second robot arms, and a robot controller for controlling the movements of the actuator. The method comprising the steps of: determining a presence of a first torque indication at the actuator to be interpreted as a first command to the robot controller; repeatedly obtaining an external torque value to thereby obtain an external torque behaviour; comparing the external torque behaviour with the first torque indication; and executing a robot function corresponding to the first command upon detecting that the external torque behaviour corresponds to the first torque indication. The obtained external torque behaviour depends on a reference torque value obtained from a dynamic model of the robot. When a reference value for the torque is obtained from a dynamic model, an external torque can be detected during arbitrary robot movements that are executed for the first time.

According to one embodiment of the invention, the method further comprises the step of exerting a force according to the first force indication on the actuator.

According to one embodiment of the invention, the method further comprises the step of filtering the external torque behaviour.

According to one embodiment of the invention, the first command is a command to continue or to stop a work cycle of the robot.

According to one embodiment of the invention, the first torque indication defines a minimum magnitude of the external torque behaviour.

According to one embodiment of the invention, the first torque indication defines a minimum duration above the minimum magnitude of the external torque behaviour.

According to one embodiment of the invention, the joint defines a revolute pair between the first and second robot arms.

According to one embodiment of the invention, the actuator is a servo motor.

According to one embodiment of the invention, the execution of the robot function corresponding to the first command is carried out after a predetermined delay after detecting that the external torque behaviour corresponds to the first torque indication.

According to one embodiment of the invention, the method further comprises the steps of: determining a presence of a second torque indication at the actuator to be interpreted as a second command to the robot controller; comparing the external torque behaviour with the second torque indication; and executing a robot function corresponding to the second command upon detecting that the external torque behaviour corresponds to the second torque indication.

According to one embodiment of the invention, the second command overrules the first command.

According to a second aspect of the invention, there is provided an industrial robot comprising a first robot arm, a second robot arm, a joint defining a kinematic pair between the first and second robot arms, an actuator for generating relative movement between the first and second robot arms, and a robot controller for controlling the movements of the actuator, the robot controller being configured to execute a method according to the description hereinbefore.

BRIEF DESCRIPTION OF THE DRAWINGS

The invention will be explained in greater detail with reference to the accompanying drawings, wherein.

DETAILED DESCRIPTION

Figure 1:
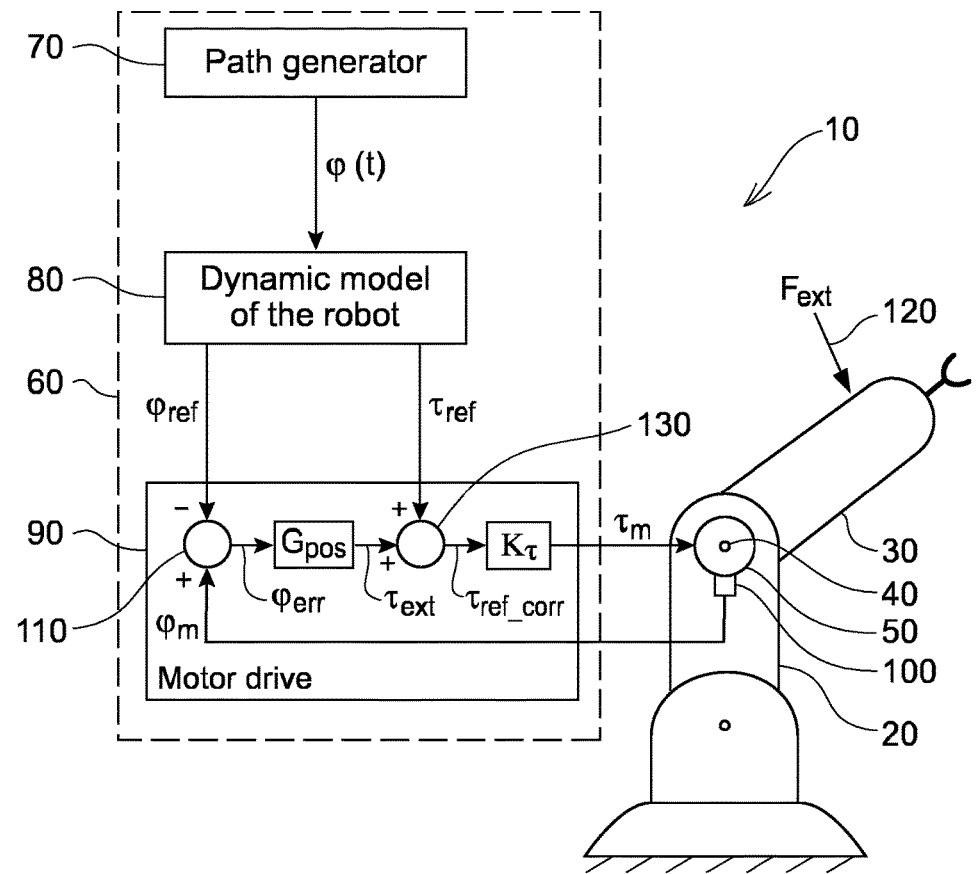
FIG. 1 shows a robot according to one embodiment of the invention.

Referring to FIG. 1, an industrial robot 10 comprises a lower arm 20, an upper arm 30, a joint 40 defining a revolute kinematic pair between the lower and upper arms 20, 30, an actuator in the form of a servo motor 50 for generating relative rotating movement between the lower and upper arms 20, 30, and a robot controller 60 for controlling the movements of the servo motor 50. The robot controller 60 comprises a path generator 70 calculating a position of the servo motor 50 as a function of time φ(t) out of an input from an operator of the robot 10. For example, the operator may give the robot controller 60 a start position and an end position of a robot tool, and the path generator 70 automatically calculates the positions of the servo motor 50 at each point in time in order to achieve the desired movement at a predetermined speed. It is to be understood that an industrial robot 10 typically comprises a plurality of servo motors 50, such as six servo motors 50, but for the sake of simplicity only one servo motor 50 is considered in the present example.

The robot controller 60 furthermore comprises a dynamic model 80 of the robot 10, which is a mathematical model comprising relevant factors affecting static and dynamic properties at the servo motor 50. A dynamic model 80 for a joint 40 may be expressed as $$\tau = M(\varphi)\ddot{\varphi} + C(\varphi,\dot{\varphi}) + D\dot{\varphi} + \tau_g(\varphi) + \tau_s(\varphi) + \tau_f(\dot{\varphi}), \quad (1)$$

where τ is torque at a joint 40, φ is an angular joint position of the joint 40, M(φ) is an inertia vector, C(φ, φ̇) relates to speed dependent terms (e.g. Coriolis and centrifugal), D is a damping vector, $\tau_g(\varphi)$ is a gravity-induced torque, $\tau_s(\varphi)$ is a nonlinear stiffness, and $\tau_f(\dot{\varphi})$ is torque caused by static and dynamic friction. If the servo motor 50 is connected to the joint 40 via a gearbox the gear ratio and the dynamics of the gearbox need to be taken into account when defining the dynamic model 80. It is considered that a person skilled in the art in the technical field of the present patent application is capable of providing a dynamic model 80 of a robot 10. Reference is made to U.S. Pat. No. 6,218,801 B1 to illustrate the level of skill of a person skilled in the art.

The dynamic model 80 of FIG. 1 is configured to repeatedly provide a motor drive 90 with reference torque value $\tau_{ref}$ and a reference position value $\varphi_{ref}$. The servo motor 50 is provided with a resolver 100 to measure motor position, and the resolver 100 is configured to repeatedly provide the motor drive 90 with a motor position value $\varphi_m$. At a first summing point 110 the reference position value $\varphi_{ref}$ is deduced from the motor position value $\varphi_m$, and a resulting position error value $\varphi_{err}$ is given as an input to a transfer function $G_{pos}$ that turns the position error value $\varphi_{err}$ into an external torque value $\tau_{ext}$ corresponding to an external force exerting a torque on the joint 40. For example, an operator may give the upper arm 30 a push corresponding to an external force value $F_{ext}$ in the direction of the arrow 120 in FIG. 1 to thereby exert a corresponding external torque on the joint 40.

At a second summing 130 point the external torque value $\tau_{ext}$ is added to the reference torque value $\tau_{ref}$, and the resulting corrected reference torque value $\tau_{ref\_corr}$ is given as an input to generate a corresponding motor current and ultimately a motor torque $\tau_m$ at the servo motor 50. The torque constant $K_\tau$ corresponds to a total amplification of both the motor drive 90 and the servo motor 50.

The external torque value $\tau_{ext}$ depends not only on external forces but also on errors in the calculated reference torque value $\tau_{ref}$ in relation to real torques present at the joint 40. However, when the dynamic model 80 is appropriately defined, the errors will be relatively constant and small such that the external torque value $\tau_{ext}$ can be considered to principally reflect torques caused by external forces on the robot 10. By repeatedly obtaining the external torque value $\tau_{ext}$ an external torque behaviour 140, i.e. the external torque value $\tau_{ext}$ overtime, can be obtained and observed. The obtained external torque behaviour 140 can be filtered appropriately to remove or decrease the effect of the aforementioned errors, or to make the obtained external torque behaviour 140 otherwise more suitable for the purposes of the present method.

Figure 2:
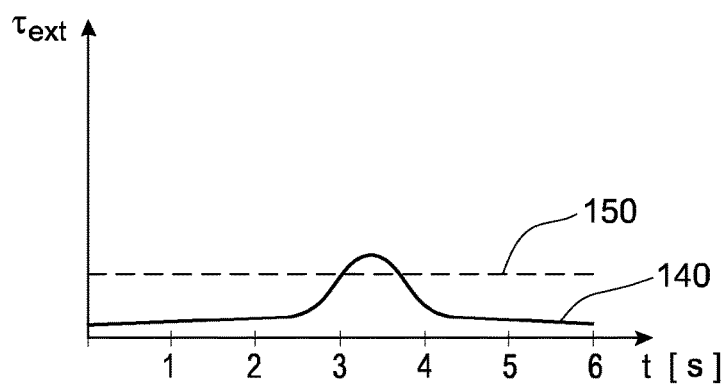
FIG. 2 shows an example of an external torque behaviour at an actuator.

FIG. 2 shows an example of an external torque behaviour 140 at the joint 40 over six seconds. From 0 to 2 seconds and from 4 to 6 seconds no external force is exerted on the robot 10, and the external torque value $\tau_{ext}$ should ideally be zero. However, because of errors in the calculated reference torque value $\tau_{ref}$ in relation to real torques present at the joint 40, the external torque value $\tau_{ext}$ never reaches zero in the present example. The absolute magnitudes of the external torque values $\tau_{ext}$ are however of less interest than the shape of the external torque behaviour 140. As can be seen in FIG. 2, between 2 and 4 seconds the external torque values $\tau_{ext}$ are higher than during the neighbouring time periods. It can be concluded that during this period an external force on the robot 10 has been present. Such conclusion can be based on comparison of the external torque behaviour 140 with predetermined torque indications. A simple example of such torque indication is a threshold value 150 that is clearly above any external torque value $\tau_{ext}$ resulting solely from errors. By comparing each external torque value $\tau_{ext}$ with the threshold value 150, it can be detected whether the external torque behaviour 140 corresponds to the torque indication.

External torques can be turned into commands to the robot controller 60 by determining that a presence of a certain torque indication at the servo motor 50 is to be interpreted as a corresponding command to the robot controller 60. For example, a presence of a torque indication wherein the external torque value $\tau_{ext}$ remains above a threshold value 150 for at least 0.5 seconds (FIG. 2) can be determined to be interpreted as a command to the robot controller 60 to continue a work cycle if the robot 10 is at standstill, and to stop a work cycle if the robot 10 is moving. The robot controller 60 then continues or stops, respectively, a work cycle upon detecting that the external torque behaviour 140 corresponds to the mentioned torque indication. This example implies that the external force needs to have a certain magnitude and a certain duration before it is interpreted as a command to the robot controller 60. A push given appropriately by an operator on the robot 10 results in a torque indication at the servo motor 50, and depending on the force, duration, direction and other factors of the push, the torque indication may get very different forms. It is to be understood that a presence of any suitable torque indication at the servo motor 50 can be determined to be interpreted as a command to the robot controller 60. For example, a torque indication may correspond to a series of pushes on the robot 10. It is furthermore to be understood that any suitable command to the robot controller 60 can be based on exerting external force on the robot 10.

A plurality of different torque indications at the servo motor 50 can be determined to be interpreted as a corresponding plurality of different commands to the robot controller 60. The same torque indication can also be determined to be interpreted as different commands depending on the status of the robot 10. This is the situation in the example above where a presence of one and the same torque indication is determined to be interpreted as a command to the robot controller 60 to continue a work cycle if the robot 10 is at standstill, and to stop a work cycle if the robot 10 is moving. It can furthermore be determined that a command corresponding to the latest torque indication overrules any previous commands. An execution of a robot function corresponding to a command can thereby be interrupted in case a later torque indication corresponding to another command is detected. An execution of a robot function corresponding to a command can furthermore be delayed such that an operator has time to overrule a command even before the execution of the corresponding robot function is started.

The invention is not limited to the embodiments shown above, but the person skilled in the art may modify them in a plurality of ways within the scope of the invention as defined by the claims.

The invention claimed is:

1. A method for controlling an industrial robot, the industrial robot comprising a first robot arm, a second robot arm, a joint defining a kinematic pair between the first and second robot arms, an actuator for generating relative movement between the first and second robot arms, and a robot controller for controlling the movements of the actuator, the method comprising the steps of:
   determining a presence of a first torque indication at the actuator to be interpreted as a first command to the robot controller;
   repeatedly obtaining an external torque value ($\tau\_ext$) to thereby obtain an external torque behaviour, the external torque behaviour depending on a reference torque value ($\tau\_ref$) obtained from a dynamic model of the industrial robot;
   comparing the external torque behaviour with the first torque indication; and
   executing, on the condition that no second command overruling the first command is provided to the robot controller, a robot function corresponding to the first command upon detecting that the external torque behaviour corresponds to the first torque indication;
   determining a presence of a second torque indication at the actuator to be interpreted as a second command to the robot controller;
   comparing the external torque behaviour with the second torque indication; and
   executing a robot function corresponding to the second command upon detecting that the external torque behaviour corresponds to the second torque indication, wherein the second command overrules the first command.

2. The method according to claim 1, wherein the method further comprises the step of exerting a force according to the first force indication on the actuator.

3. The method according to claim 1, wherein the method further comprises the step of filtering the external torque behaviour.

4. The method according claim 1, wherein the first command is a command to continue or to stop a work cycle of the industrial robot.

5. The method according to claim 1, wherein the first torque indication defines a minimum magnitude of the external torque behaviour.

6. The method according to claim 5, wherein the first torque indication defines a minimum duration above the minimum magnitude of the external torque behaviour.

7. The method according to claim 1, wherein the joint defines a revolute pair between the first and second robot arms.

8. The method according to claim 1, wherein the actuator is a servo motor.

9. The method according to claim 1, wherein the execution of the robot function corresponding to the first command is carried out after a predetermined delay after detecting that the external torque behaviour corresponds to the first torque indication.

10. An industrial robot comprising a first robot arm, a second robot arm, a joint defining a kinematic pair between the first and second robot arms, an actuator for generating relative movement between the first and second robot arms, and a robot controller for controlling the movements of the actuator, the robot controller being configured to execute a method comprising the steps of:
    determining a presence of a first torque indication at the actuator to be interpreted as a first command to the robot controller;
    repeatedly obtaining an external torque value ($\tau\_ext$) to thereby obtain an external torque behaviour, the external torque behaviour depending on a reference torque value ($\tau\_ref$) obtained from a dynamic model of the industrial robot;
    comparing the external torque behaviour with the first torque indication; and
    executing, on the condition that no second command overruling the first command is provided to the robot controller, a robot function corresponding to the first command upon detecting that the external torque behaviour corresponds to the first torque indication;
    determining a presence of a second torque indication at the actuator to be interpreted as a second command to the robot controller;
    comparing the external torque behaviour with the second torque indication; and
    executing a robot function corresponding to the second command upon detecting that the external torque behaviour corresponds to the second torque indication, wherein the second command overrules the first command.

* * * * *